US010316930B2

(12) United States Patent
Verhoog et al.

(10) Patent No.: US 10,316,930 B2
(45) Date of Patent: Jun. 11, 2019

(54) DEVICE FOR DAMPING TORSIONAL OSCILLATIONS

(71) Applicant: VALEO EMBRAYAGES, Amiens (FR)

(72) Inventors: Roel Verhoog, Gournay sur Aronde (FR); Franck Cailleret, Amiens (FR)

(73) Assignee: Valeo Embrayages, Amiens (FR)

( * ) Notice: Subject to any disclaimer, the term of this patent is extended or adjusted under 35 U.S.C. 154(b) by 293 days.

(21) Appl. No.: 15/170,274

(22) Filed: Jun. 1, 2016

(65) Prior Publication Data

US 2016/0348753 A1 Dec. 1, 2016

(30) Foreign Application Priority Data

Jun. 1, 2015 (FR) ..................................... 15 54940

(51) Int. Cl.
*F16F 15/14* (2006.01)

(52) U.S. Cl.
CPC ........ *F16F 15/145* (2013.01); *F16F 2230/00* (2013.01)

(58) Field of Classification Search
CPC ..................................................... F16F 15/145
See application file for complete search history.

(56) References Cited

U.S. PATENT DOCUMENTS

2012/0055281 A1* 3/2012 Huegel ................. F16F 15/145 74/574.2
2013/0233125 A1* 9/2013 Jung ..................... F16F 15/123 74/574.2
2013/0283967 A1* 10/2013 Movlazada ........... F16F 15/145 74/574.2
2015/0053519 A1* 2/2015 Ray .......................... F16F 7/10 188/378
2015/0075320 A1* 3/2015 Verhoog ............... F16F 15/145 74/574.2
2015/0204416 A1* 7/2015 Schnaedelbach ..... F16F 15/145 74/574.2

(Continued)

FOREIGN PATENT DOCUMENTS

DE 102006028556 1/2007
DE 102009053482 A1 * 9/2010

(Continued)

*Primary Examiner* — Vinh Luong
(74) *Attorney, Agent, or Firm* — Berenato & White, LLC

(57) ABSTRACT

A device for damping torsional oscillations, comprising:

a support capable of moving rotationally around an axis;

a plurality of pendulum bodies, each pendulum body being movable with respect to the support; and a plurality of bearing members, each bearing member interacting with a first raceway integral with the support and with at least one second raceway integral with a pendulum body, the movement of each pendulum body with respect to the support being guided by two of those bearing members, the support comprising a plurality of windows in each of which two bearing members are received, one of those bearing members interacting with at least one second raceway integral with one of the pendulum bodies, and the other of those bearing members interacting with at least one second raceway integral with another of those pendulum bodies, the pendulum bodies being circumferentially adjacent.

20 Claims, 4 Drawing Sheets

(56) References Cited

U.S. PATENT DOCUMENTS

| | | | | |
|---|---|---|---|---|
| 2016/0195164 A1* | 7/2016 | Verhoog | ............... | F16F 15/145<br>74/574.2 |

FOREIGN PATENT DOCUMENTS

| | | | |
|---|---|---|---|
| DE | 102011086532 | | 6/2012 |
| DE | 102013213008 | A1 * | 2/2014 |
| WO | WO 2013/156733 | A1 * | 10/2013 |

* cited by examiner

DEVICE FOR DAMPING TORSIONAL OSCILLATIONS

CROSS-REFERENCE TO RELATED APPLICATIONS AND CLAIM TO PRIORITY

This application is related to Patent Application No. 1554940 filed June 2015 in France, the disclosure of which is incorporated herein by reference and to which priority is claimed.

FIELD OF THE INVENTION

The present invention relates to a device for damping torsional oscillations, in particular for a motor vehicle transmission system.

BACKGROUND OF THE INVENTION

In such an application the device for damping torsional oscillations can be integrated into a torsional damping system of a clutch capable of selectively connecting the combustion engine to the gearbox, in order to filter vibrations due to irregularities of the engine.

As a variant, in such an application the device for damping torsional oscillations can be integrated into a friction disk of the clutch or into a hydrodynamic torque converter.

A device of this kind for damping torsional oscillations conventionally utilizes a support and one or more pendulum bodies that are movable with respect to that support. The movement of each pendulum body with respect to the support is generally guided by two bearing members each interacting on the one hand with a raceway integral with the support, and on the other hand with one or more raceways integral with the pendulum body.

Each bearing member is then received in a window that is configured in the support and is specific to that bearing member, a portion of the periphery of that window forming the raceway integral with the support. It is thus necessary to implement in the support twice as many windows as there are pendulum bodies. When each pendulum body comprises two pendulum masses riveted to one another, and those rivets are each received in a specific and different opening of an aforesaid window, for example in accordance with what is disclosed in the Application DE 10 2006 028 556, the number of passages to be configured in the support increases further.

A need thus exists to simplify implementation of the support of a device for damping torsional oscillations of the pendulum type without affecting the filtering performance provided by that device.

SUMMARY OF THE INVENTION

The invention aims to meet that need, and does so according to one of its aspects with the aid of a device for damping torsional oscillations which comprises:

a support capable of moving rotationally around an axis;

a plurality of pendulum bodies, each pendulum body being movable with respect to the support; and a plurality of bearing members, each bearing member interacting with a first raceway integral with the support and with at least one second raceway integral with a pendulum body, the movement of each pendulum body with respect to the support being guided by two of those bearing members, the support comprising a plurality of windows in each of which two bearing members are received, one of those bearing members interacting with at least one second raceway integral with one of the pendulum bodies, and the other of those bearing members interacting with at least one second raceway integral with another of those pendulum bodies, said pendulum bodies being circumferentially adjacent.

According to the invention each window configured in the support receives two bearing members associated with different pendulum bodies. The number of windows to be configured in the support is thus reduced at least by two with respect to devices of the existing art. Such a support is thus easier to implement and its mechanical strength can be improved.

Each of these windows can exhibit a continuous periphery, and a portion of that periphery can then define the first raceway with which one of the bearing members, which is received in that window and guides the movement of one of the pendulum bodies, interacts, while another portion of that periphery defines the first raceway with which the other bearing member, which is received in that window and guides the movement of the circumferentially adjacent pendulum body, interacts.

For purposes of the present Application:

"axially" means "parallel to the rotation axis of the support";

"radially" means "along an axis belonging to a plane orthogonal to the rotation axis of the support and intersecting that rotation axis of the support";

"angularly" or "circumferentially" means "around the rotation axis of the support";

"orthoradially" means "perpendicularly to a radial direction,"

"integral" means "rigidly coupled"; and the "inactive position" of the device is that position in which the pendulum bodies are subjected to a centrifugal force but not to torsional oscillations deriving from irregularities of the combustion engine.

Each bearing member can interact with the raceway integral with the support and with the raceway or raceways integral with the pendulum body solely via its external surface. A single region of that external surface can thus roll alternatively on the raceway integral with the support, and on a raceway integral with the pendulum body, when the bearing member moves.

Each bearing member is, for example, a roller having a circular section in a plane perpendicular to the rotation axis of the support. This roller can comprise several successive cylindrical regions having different radii. The axial ends of the roller can be devoid of a fine annular rim. The roller is made, for example, of steel. The roller can be hollow or solid.

The shape of the first and the second raceways can be such that each pendulum body is moved with respect to the support only in translation around a notional axis parallel to the rotation axis of the support.

As a variant, the shape of the raceways can be such that each pendulum body is moved with respect to the support:

both in translation around a notional axis parallel to the rotation axis of the support, and also rotationally around the center of gravity of said pendulum body, such a motion also being called a "combined motion" and being disclosed, for example, in the Application DE 10 2011 086 532.

The device comprises, for example, a number of pendulum bodies between two and eight, in particular three or six. All these pendulum bodies can be successive to one another circumferentially. The device can thus comprise a plurality of planes perpendicular to the rotation axis, in each of which all the pendulum bodies are arranged.

In all of the above the support can be implemented as a single part, being for example entirely metallic.

According to a first exemplifying embodiment of the invention each pendulum body can comprise two first abutment damping members, each first abutment damping member projecting circumferentially toward the circumferentially adjacent pendulum body so that two first abutment damping members that are circumferentially facing and belong respectively to two circumferentially adjacent pendulum bodies can come into contact with one another upon a movement of those pendulum bodies, each first abutment damping member being arranged in one of the windows of the support.

Two first abutment damping members that are circumferentially facing and are carried by circumferentially adjacent pendulum bodies can be received at least in part in a single window of the support.

Each first abutment damping member is, for example, exclusively contained in one window of the support. As a variant, each first abutment damping member not only can extend into a window configured in the support but also can project axially on either side of that window. As will be seen below, each pendulum body can comprise two pendulum masses between which the support is axially arranged, and planes perpendicular to the rotation axis of the support can then exist, in which planes the first abutment damping member is arranged beyond a circumferential end of a pendulum mass.

According to a second exemplifying embodiment of the invention the device can comprise a plurality of synchronization members connecting circumferentially adjacent pendulum bodies pairwise, each synchronization member being arranged in one of the windows of the support. Synchronization members of this kind prevent the pendulum bodies from performing asynchronous relative motions and thus improve the damping effect.

Each window of the support thus receives; a bearing member guiding the movement of a pendulum body; a bearing member guiding the movement of another, circumferentially adjacent pendulum body; and the synchronization member connecting said pendulum bodies.

Each synchronization member can be rigidly coupled to the two pendulum bodies that it connects. As a variant, each synchronization member is pivot-mounted on each of those pendulum bodies, being e.g. a link mounted pivotingly on each of those pendulum bodies.

Each synchronization member can be deformable or not.

According to one or other of the above exemplifying embodiments, each pendulum body can comprise at least one second abutment damping member abutting against the support. Each pendulum body comprises, for example, two second abutment damping members. Each of these second abutment damping members can then come into contact with the support in order to damp the abutment of the pendulum body against the latter, for example:

following a counter-clockwise movement of that pendulum body from the inactive position; or following a clockwise movement of that pendulum body from the inactive position; or in the event of a radial drop of the pendulum body, for example upon stoppage of the combustion engine of the vehicle.

As appropriate, each second abutment damping member can damp abutment of the pendulum body against the support following a counter-clockwise movement or clockwise movement from the inactive position, but also in the event of a radial drop of the pendulum body.

Each first and each second abutment damping member can have elastic properties allowing damping of impacts associated with contact between the support and the pendulum body. That damping is then permitted by compression of the abutment damping member. The abutment damping member is made, for example, of elastomer or of rubber.

According to the first exemplifying embodiment of the invention each first abutment damping member and a second abutment damping member can constitute different portions of one and the same part. In other words, each pendulum body can then comprise at each of its circumferential ends a part, one portion of which projects circumferentially toward the circumferentially adjacent pendulum body in order to constitute a first abutment damping member, and another portion of which constitutes a second abutment damping member.

According to the second exemplifying embodiment of the invention each synchronization member and each second abutment damping member can constitute different portions of one and the same part. In other words, each pendulum body can comprise at each of its circumferential ends a part, one portion of which constitutes a synchronization member, another portion of which constitutes a second abutment damping member of that pendulum body, and another portion of which extends into the circumferentially adjacent pendulum body and constitutes a second abutment damping member of that circumferentially adjacent pendulum body.

In all of the above each pendulum body can comprise:

a first and a second pendulum mass axially spaced with respect to one another, the first pendulum mass being arranged axially on a first side of the support and the second pendulum mass being arranged axially on a second side of the support; and at least one member connecting the first and the second pendulum mass, pairing said masses.

In this case the second abutment damping member can extend around all or part of a connecting member.

Each pendulum body can extend angularly over a global angle value, measured from the axis of rotation, between two circumferential ends that correspond to the circumferential ends of the pendulum masses of that body, each second raceway being arranged inside an angular sector measured from the axis of rotation and extending from one circumferential end of the pendulum body toward the other circumferential end of that pendulum body, the ratio between that angular sector and the global angle being between $1/15$ and $1/2$, for example being between 0.1 and 0.25.

Such a position of the second raceways allows each bearing member to be maximally shifted angularly toward the outside of the pendulum body. The motion of each pendulum body is thus more precise and more stable given a constant manufacturing tolerance. The amplitude of the deflection of each pendulum body can furthermore be increased. A position of this kind of the bearing members can also increase the polar inertia of the pendulum body, which is advantageous when that pendulum body exhibits the combined motion mentioned above.

The second raceway integral with the pendulum body can be defined by the connecting member. A region of the periphery of that connecting member defines, for example, the second raceway. A connecting member of this kind is, for example, press-fitted via each of its axial ends into an opening configured in one of the pendulum masses. As a variant, the connecting member can be welded via its axial ends onto each pendulum mass.

Each pendulum mass can then comprise two connecting members pairing the first and the second pendulum mass, each connecting member defining a second raceway interacting respectively with one of the two bearing members guiding the movement of that pendulum body with respect to the support. Each bearing member then interacts with only one second raceway.

In this case each window that receives two bearing members can also receive a connecting member of a pendulum body and a connecting member of the circumferentially adjacent pendulum body. Located in each window are therefore:

a connecting member of a pendulum body and a bearing member guiding the movement of that pendulum body; and a connecting member of another pendulum body and a bearing member guiding the movement of that other pendulum body.

Each bearing member can then be stressed exclusively in compression between the aforementioned first and second raceways. These first and second raceways, interacting with a single bearing member, can be at least in part radially facing, i.e. there exist planes perpendicular to the rotation axis, in which planes both of those raceways extend.

A device of this kind for damping torsional oscillations thus exhibits a greatly reduced number of passages configured in the support, since for a number n of pendulum bodies, n windows allow guidance of those n pendulum bodies and connection between the pendulum masses of each of those pendulum bodies. When the second raceways are shifted angularly toward the outside of the pendulum bodies, as mentioned previously, those windows can have a particularly reduced angular dimension.

As a variant, each bearing member can interact with two second raceways integral with the pendulum body, one of those second raceways being defined by the first pendulum mass and the other of those second raceways being defined by the second pendulum mass. Each connecting member is then, for example, a rivet, being received in an opening of the support different from the window in which a bearing member is received. Each bearing member can then comprise, axially successively:

a region arranged in a cavity of the first pendulum mass and interacting with the second raceway constituted by a portion of the periphery of that cavity;

a region arranged in a window of the support and interacting with the first raceway constituted by a portion of the periphery of that window; and a region arranged in a cavity of the second pendulum mass and interacting with the second raceway constituted by a portion of the periphery of that cavity.

According to this variant each pendulum body can comprise at least one, in particular two connecting members pairing the first and the second pendulum mass, all the connecting members of that pendulum mass being arranged in the angular space defined between the two bearing members guiding the movement of that pendulum body with respect to the support. The connecting member or members can then be arranged in the central zone, angularly speaking, of the pendulum body.

Again according to this variant in which two second raceways integral with the pendulum body are provided, but alternatively to the preceding paragraph, it is possible for all or some of the connecting members of the pendulum body to be received in windows that already receive bearing members. Each window configured in the support then receives, for example:

a connecting member of a pendulum body and a bearing member guiding the movement of that pendulum body; and a connecting member of another pendulum body and a bearing member guiding the movement of that other pendulum body.

In this case the bearing members are then arranged radially externally with respect to the connecting members. Similarly to what was mentioned previously, the number of openings configured in the support in order to allow guidance of the pendulum bodies and connection between the pendulum masses of each of those pendulum bodies is then particularly reduced.

In all of the above the device can comprise at least one interposition part, at least a portion of which is arranged axially between the support and a pendulum mass of the pendulum body. An interposition part of this kind can thus limit the axial movement of the pendulum body with respect to the support, thus preventing axial impacts between said parts and thus undesirable wear and noise, especially when the support and/or the pendulum mass are made of metal. Several interposition parts, for example in the form of sliders, can be provided. The interposition parts are made in particular of a damping material such as plastic or rubber.

The interposition parts are, for example, carried by the pendulum bodies. The interposition parts can be positioned on a pendulum body in such a way that there is always at least one interposition part at least a portion of which is interposed axially between a pendulum mass and the support regardless of the relative positions of the support and of said mass upon movement of the pendulum body with respect to the support.

In all of the above the device can comprise:

at least one first pendulum body allowing filtering of torsional oscillations of a first order value; and at least one second pendulum body allowing filtering of torsional oscillations of a second order value different from the first order value.

A further object of the invention in accordance with another of its aspects is a component for a transmission system of a motor vehicle, the component being in particular a dual mass flywheel, a hydrodynamic torque converter, or a friction clutch disk, or a dry or wet dual clutch or a wet single clutch or a flywheel integral with a crankshaft, that component comprising a device for damping torsional oscillations as defined above.

The support of the device for damping torsional oscillations can then be one among:

a web of the component;

a guide washer of the component;

a phase washer of the component; or a support different from said web, said guide washer, and said phase washer.

BRIEF DESCRIPTION OF THE DRAWINGS

A better understanding of the invention may be gained from reading the description below of a non-limiting exemplifying embodiment thereof, and from an examination of the attached drawings, in which.

DETAILED DESCRIPTION OF THE PREFERRED EMBODIMENT(S)

Figure 1:
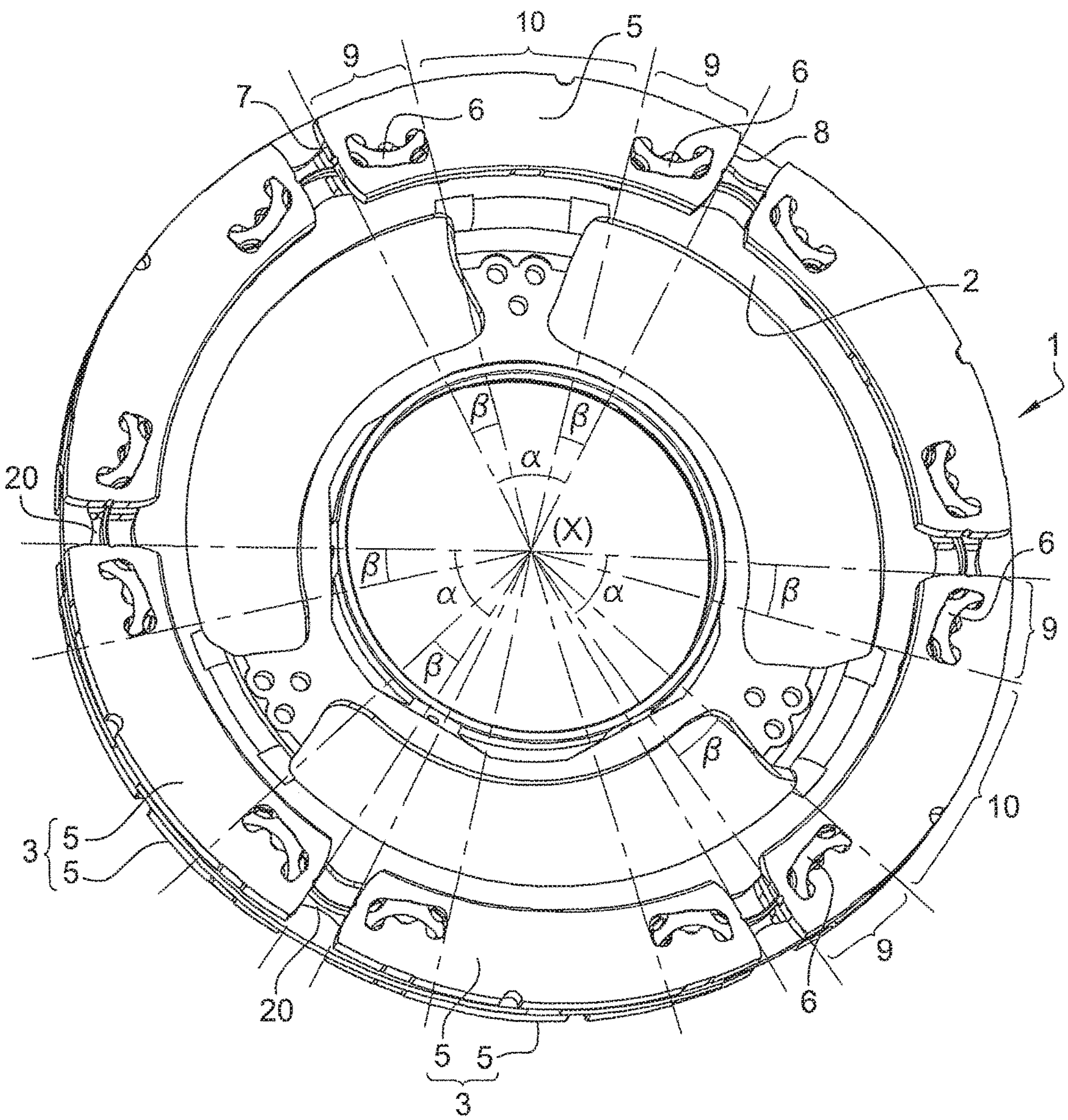
FIG. 1 schematically depicts a device for damping torsional oscillations, according to a first embodiment of the invention.

FIG. 1 depicts a device 1 for damping torsional oscillations, according to an embodiment of the invention. Damping device 1 is of the pendulum oscillator type. Device 1 is capable in particular of being part of a motor vehicle transmission system, for example being integrated into a component (not depicted) of such a transmission system, that component being, for example, a dual mass flywheel, a hydrodynamic torque converter, or a clutch disk.

That component can be part of a drive train of a motor vehicle, the latter comprising a combustion engine having in particular three or four cylinders.

In FIG. 1 device is inactive, i.e. it is not filtering the torsional oscillations transmitted by the drive train due to irregularities of the combustion engine.

In known fashion, such a component can comprise a torsional damper exhibiting at least one input element, at least one output element, and circumferentially acting elastic return members that are interposed between said input and output elements. For purposes of the present Application the terms "input" and "output" are defined with respect to the direction of torque transmission from the combustion engine of the vehicle toward the latter's wheels.

In the example considered, device 1 comprises:

a support 2 capable of moving rotationally around an axis X; and a plurality of pendulum bodies 3 movable with respect to support 2.

In the example considered, six pendulum bodies 3 are provided, being distributed uniformly around axis X.

Support 2 of damping device 1 can be constituted by:

an input element of the torsional damper;

an output element or an intermediate phasing element arranged between two series of springs of the damper;

an element rotationally connected to one of the aforementioned elements and different from the latter, being then, for example, a support specific to device 1.

Support 2 is, in particular, a guide washer or a phase washer. The support can also be different, for example a flange of the component.

In the example considered, support 2 is globally in the shape of a ring having two opposite sides 4 that here are planar faces.

As is evident in particular from FIG. 1, in the example considered each pendulum body 3 comprises:

two pendulum masses 5, each pendulum mass 5 extending axially facing one side 4 of support 2; and two connecting members 6 integrating the two pendulum masses 5.

Figure 2:
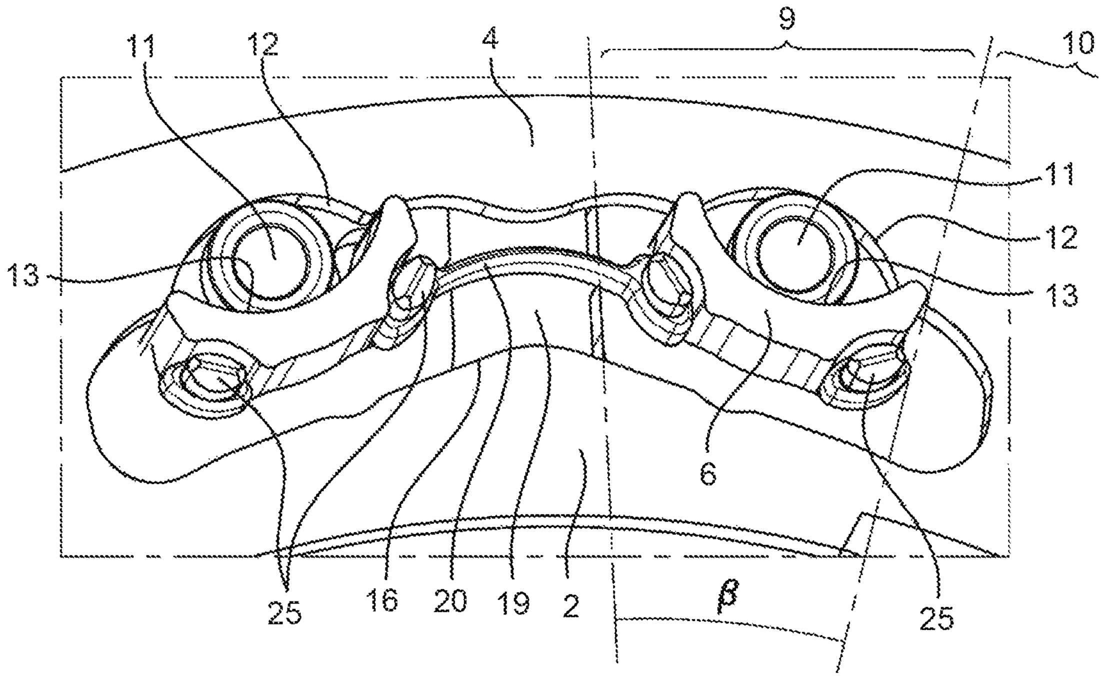
FIG. 2 shows a detail of FIG. 1.
Figure 3:
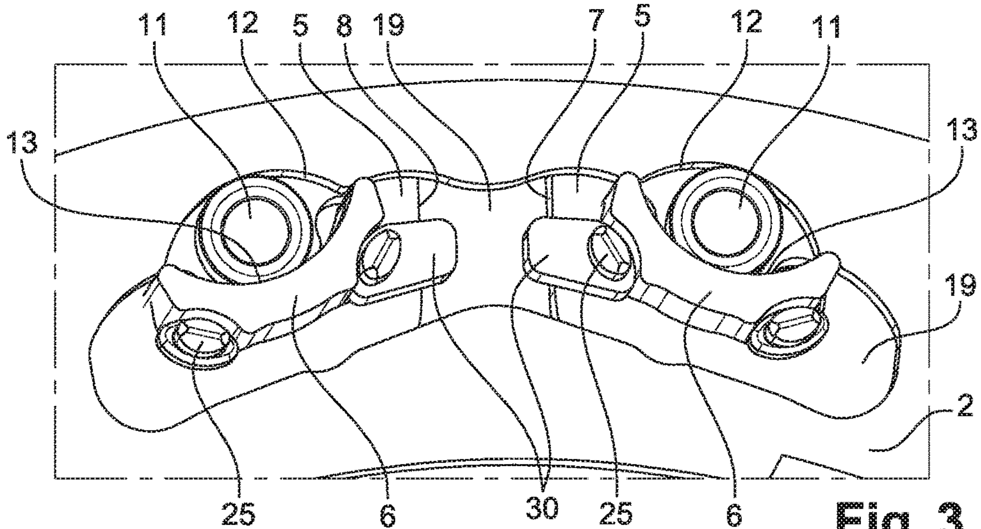
FIG. 3 is a view, similar to FIG. 2, of a second exemplifying embodiment of the invention.

One of pendulum masses 5 is not depicted in FIGS. 2 and 3 so that support 2 can be seen better.

In the example considered, connecting members 6, also called "spacers," are angularly offset. Here each connecting member 6 is shifted angularly toward the outside of the each pendulum body 3. Each body 3 extends angularly over a global angle value α, measured from rotation axis X of support 2, between two circumferential ends that correspond respectively to circumferential ends 7 and 8 of pendulum masses 5 of that body, and each connecting member 6 is then arranged inside a peripheral zone 9 of the pendulum body, that peripheral zone 9 extending from one end 7 or 8 of pendulum body 3 toward the other end 8 or 7 of that pendulum body over an angular sector β measured from axis X, the ratio β/α being between 1/15 and ½, being in particular between 0.1 and 0.25. In other words, and as is evident in particular from FIG. 1, in the example described each pendulum body 3 successively comprises, moving from the inside of that pendulum body 3 from one circumferential end 7 toward its other circumferential end 8:

a peripheral zone 9 in which one of connecting members 6 of pendulum body 3 is arranged;

a central zone 10 having no connecting member 6; and another peripheral zone 9 in which the other connecting member 6 of pendulum body 3 is arranged.

In the example of FIGS. 1 to 5, each end of a connecting member 6 is press-fitted into an opening 17 configured in one of pendulum masses 5 of pendulum body 3, in order to integrate those two pendulum masses 5 with one another. As a variant, each end of a connecting member is integrated with one of pendulum masses 5 by welding.

Device 1 also comprises bearing members 11 guiding the movement of pendulum bodies 3 with respect to support 2. Bearing members 11 here are rollers exhibiting several different successive diameters.

In the example described, the motion of each pendulum body 3 with respect to support 2 is guided by two bearing members 11.

Each bearing member 11 is received in a window 19 configured in support 2. As depicted in these Figures, two bearing members 11 associated with two different and circumferentially adjacent pendulum bodies 3 are received in the same window 19 configured in support 2. In other words, a bearing member 11 guiding the movement of a pendulum body 3, and a bearing member 11 guiding the movement of another pendulum body 3 that is circumferentially adjacent, are received within the same window 19. Each window 19 has a continuous periphery 16, and a portion of that periphery 16 defines a first raceway 12, integral with support 2, on which one of bearing members 11 received in that window 19 will roll, while another portion of that continuous periphery 16 defines another first raceway 12, integral with support 2, on which the other bearing member 11 received in window 19 will roll.

In the example of FIGS. 1 to 5 each window 19 furthermore receives:

a connecting member 6 of a pendulum body 3; and a connecting member 6 of another pendulum body 3 that is circumferentially adjacent.

In the example of FIGS. 1 to 5 each connecting member 6 defines a second raceway 13 that is integral with the pendulum body 3 to which that connecting member 6 belongs, and on which raceway one of bearing members 11 rolls in order to guide the movement of that pendulum body 3 with respect to support 2.

In the example of FIGS. 1 and 2 synchronization members 20 are provided. Here each synchronization member 20 is interposed between two circumferentially adjacent pendulum bodies 3 that it connects to one another. Here each synchronization member 20 is integral with each of the pendulum bodies 3 that it connects.

Each pendulum body 3 also comprises two second abutment damping members 25 for that pendulum body against support 2. One of these second abutment damping members 25 comes into contact with support 2, for example, following a counter-clockwise movement of pendulum body 3 from its inactive position and also in the case of a radial drop of that pendulum body 3, while the other second abutment damping member 25 comes into contact with support 2 following a clockwise movement of pendulum body 3 from its inactive position, and if applicable also in the case of a radial drop of that pendulum body 3.

Each second abutment damping member 25 is, for example, positioned radially between a connecting member 6 and periphery 16 of window 19. In the example of FIGS. 1 and 2 each second abutment damping member 25 extends between two axial ends, each of them being received in a hole configured in one of pendulum masses 5 in order to integrate that second abutment damping member 25 with each of those pendulum masses 5.

As is evident from FIG. 2, each second abutment damping member 25 can be implemented in several portions, and one of those portions can constitute a single part with a synchronizing member 20, that part here being made of elastomer.

Figure 4:
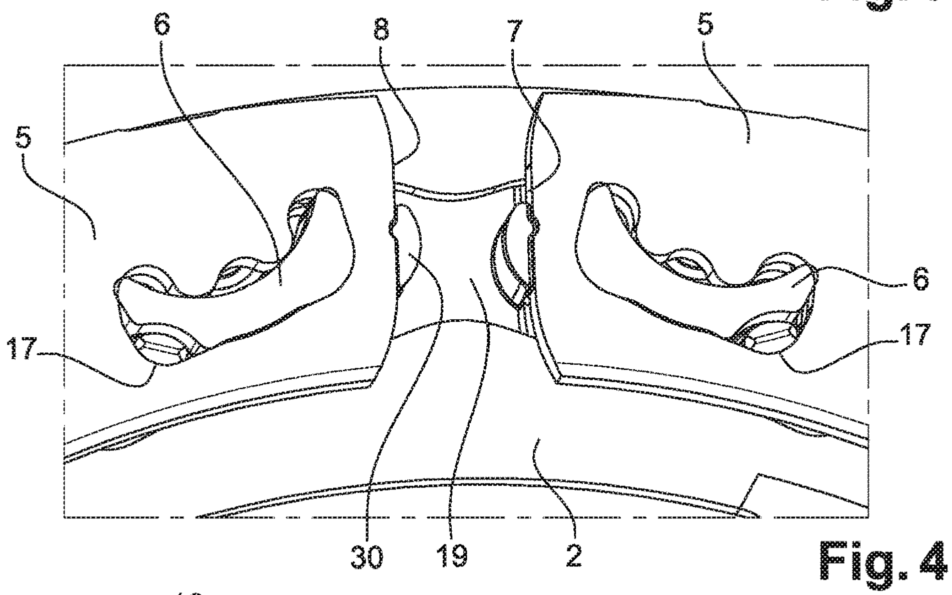
FIGS. 4 and 5 are different views of a variant of the second exemplifying embodiment of the invention.
Figure 5:
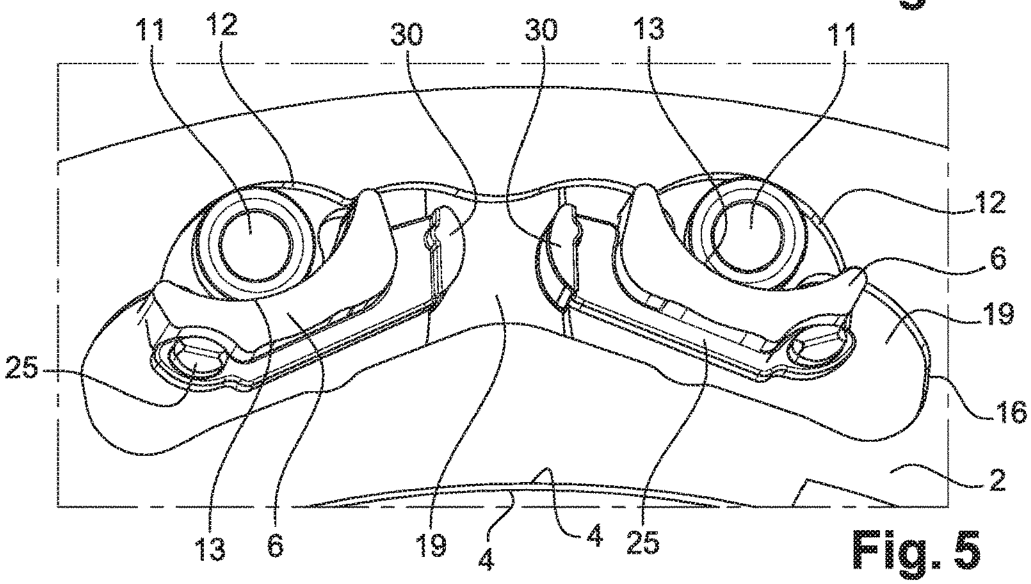

FIGS. 3 to 5 depict different variants of a second exemplifying embodiment of the invention. One of pendulum masses 5 of pendulum body 3 is not depicted in FIGS. 3 to 5. This second exemplifying embodiment differs from the one described with reference to FIGS. 1 and 2 in that device 1 has no synchronization members 20.

According to this second example each pendulum body 3 comprises two first abutment damping members 30, each first abutment damping member 30 projecting circumferentially beyond one of circumferential ends 7 and 8 of pendulum body 3 toward the circumferentially adjacent pendulum body 3. Two first abutment damping members 30 that are circumferentially facing and belong respectively to two circumferentially adjacent pendulum bodies 3 can in this fashion come into contact with one another upon a movement of those pendulum bodies 3. As depicted in FIG. 3 these circumferentially facing first abutment damping members 30 are received in the same window 19 configured in support 2.

As is evident from FIGS. 3 to 5, each first abutment damping member 30 is arranged at least in part in a window 19.

Again according to FIGS. 3 to 5, each first abutment damping member 30 is made in one piece with all or a portion of a second abutment damping member 25. That part is made, for example, of elastomer or rubber.

In the example of FIG. 3 each first abutment damping member 30 extends exclusively inside a window 19.

In the example of FIGS. 4 and 5 each first abutment damping member 30 extends not only inside a window 19, but also axially on either side of that window 19. Each first abutment damping member 30 extends, for example, along a circumferential end 7 or 8 of pendulum body 3.

As is evident from FIG. 5, when each second abutment damping member 25 is in a single piece, one and the same part can constitute both a first abutment damping member 30 and a second abutment damping member 25.

Other examples of devices 1 for damping torsional oscillations according to the invention will now be described with reference to FIGS. 6 to 8. The examples of FIGS. 6 to 8 differ from what has been described with reference to FIGS. 1 to 5 in that each bearing member 11 interacts with two second raceways 13 that are not defined by a connecting member 6. One of these two second raceways 13 is defined by a portion of the periphery of a cavity 35 configured in first pendulum mass 5, while the other of those second raceways 13 is defined by a portion of the periphery of a cavity 35 configured in second pendulum mass 5 of pendulum body 3.

Figure 7:
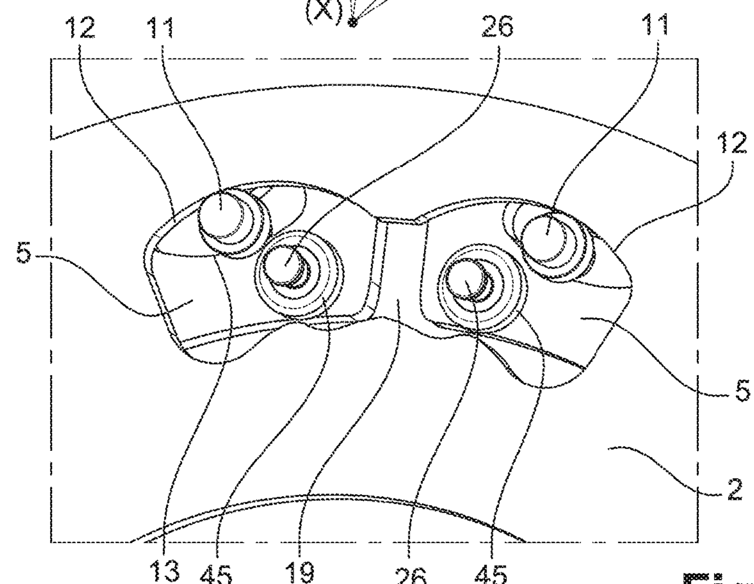
FIGS. 7 and 8 depict a detail of another device for damping torsional oscillations according to the invention.

In the example of FIG. 7 each bearing member comprises, axially successively:

a region arranged in a cavity 35 of first pendulum mass 5 and interacting with second raceway 13 constituted by a portion of the periphery of that cavity 35;

a region arranged in a window 19 of support 2 and interacting with first raceway 12 constituted by a portion of the periphery of that window 19; and a region arranged in a cavity 35 of second pendulum mass 5 and interacting with second raceway 13 constituted by a portion of the periphery of that cavity 35.

Each pendulum body 3 also comprises connecting members 26 pairing the two pendulum masses 5 of that pendulum body 3, but these connecting members 26 are different from the connecting members 6 described with reference to FIGS. 1 to 6. The connecting members 26 here are rivets. Each rivet 26 is equipped, for example, with an abutment damping member 45 visible in FIG. 7, the latter having the shape of a ring made of a material such as elastomer.

Figure 6:
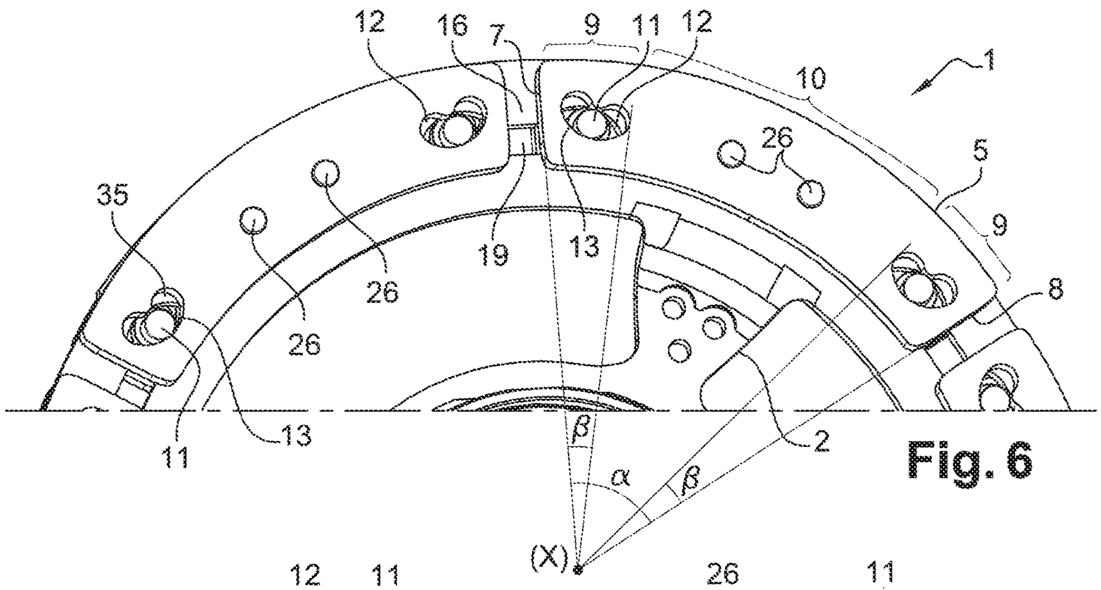
FIG. 6, similarly to FIG. 1, depicts another device for damping torsional oscillations according to the invention.

In the example of FIG. 6, the rivets 26 are arranged in central zone 10 of a pendulum body 3 and pass through a cavity of support 2 which is different from a window 19. In this example each pendulum body 3 comprises two rivets 26 that are angularly surrounded on each side by a bearing member 11. Similarly to what has been described previously, each window 19 configured in the support receives on the one hand a bearing member 11 guiding the movement of a pendulum body 3, and on the other hand a bearing member 11 guiding the movement of another circumferentially adjacent pendulum body 3.

Figure 8:
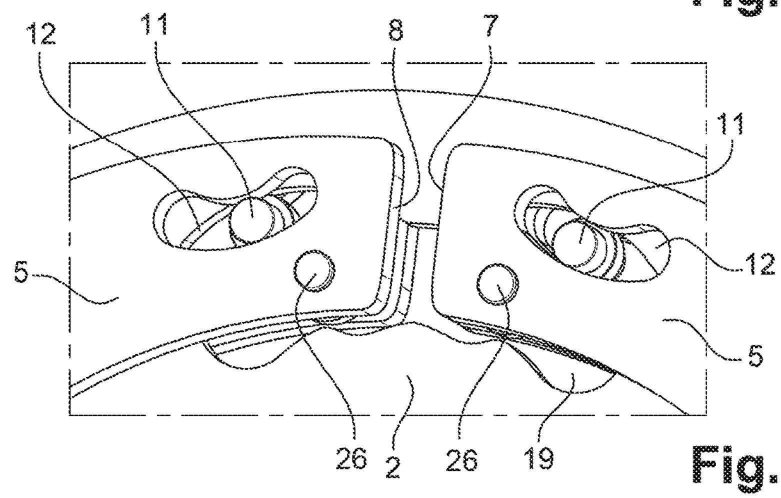

FIGS. 7 and 8 differ from what has been described with reference to FIG. 6 in that the rivets 26 are also received in windows 19. In other words, and as is evident from FIG. 7, each window 19 configured in support 2 then receives:

a rivet 26 of a pendulum body 3 and a bearing member 11 guiding the movement of that pendulum body 3; and a rivet 26 of another pendulum body 3 and a bearing member 11 guiding the movement of that other pendulum body 3.

Pendulum bodies 3 are not depicted in their entirety in FIG. 7, one of pendulum bodies 5 of each pendulum body 3 not being depicted in the interest of illustrative clarity.

Although not depicted in FIGS. 6 to 8, device 1 according to those Figures can comprise synchronization members similar to those described with reference to FIGS. 1 and 2, or first abutment damping members similar to those described with reference to FIGS. 3 to 5.

The invention is not limited to the examples that have just been described.

The invention claimed is:

1. A device (1) for damping torsional oscillations, the device comprising:

a support (2) rotatable around an axis (X);

a plurality of pendulum bodies (3), each pendulum body (3) configured to move with respect to the support (2); and a plurality of bearing members (11), each bearing member (11) configured to engage a first raceway (12) of the support (2) and at least one second raceway (13) of a pendulum body (3), the movement of each pendulum body (3) with respect to the support (2) being guided by two of the bearing members (11), the support (2) comprising a plurality of windows (19), each window (19) receiving two of the bearing members (11), one of the two bearing members (11) configured to engage at least one second raceway (13) of one of the pendulum bodies (3), and the other of the two bearing members (11) configured to engage at least one second raceway (13) of another of the pendulum bodies (3), the pendulum bodies (3) being circumferentially adjacent.

2. The device according to claim 1, wherein each pendulum body (3) comprising two first abutment damping members (30), each first abutment damping member (30) projecting circumferentially toward the circumferentially adjacent pendulum body (3) so that the two first abutment damping members (30) that are circumferentially facing and belong respectively to two circumferentially adjacent pendulum bodies (3) are configured to contact with one another upon movement of the pendulum bodies (3), and wherein each first abutment damping member (30) is arranged in one of the windows (19) of the support (2).

3. The device according to claim 2, wherein each pendulum body (3) further comprises at least one second abutment damping member (25) abutting against the support (2).

4. The device according to claim 2, wherein each pendulum body (3) comprises:

- a first pendulum mass (5) and a second pendulum mass (5) axially spaced with respect to one another, the first pendulum mass (5) being arranged axially on a first side (4) of the support (2) and the second pendulum mass (5) being arranged axially on a second side (4) of the support (2); and
- at least one connecting member (6) connecting the first pendulum mass and the second pendulum mass (5) for pairing the first and second pendulum masses.

5. The device according to claim 1, further comprising a plurality of synchronization members (20) connecting circumferentially adjacent pendulum bodies (3) pairwise, wherein each synchronization member (20) is arranged in one of the windows (19) of the support (2).

6. The device according to claim 5, wherein each pendulum body (3) comprising at least one abutment damping member (25) abutting against the support (2).

7. The device according to claim 5, wherein each pendulum body (3) comprises:

- a first pendulum mass (5) and a second pendulum mass (5) axially spaced with respect to one another, the first pendulum mass (5) being arranged axially on a first side (4) of the support (2) and the second pendulum mass (5) being arranged axially on a second side (4) of the support (2); and
- at least one connecting member (6) connecting the first pendulum mass and the second pendulum mass (5) for pairing the first and second pendulum masses.

8. The device according to claim 1, wherein each pendulum body (3) comprises at least one abutment damping member (25) abutting against the support (2).

9. The device according to claim 8, wherein each pendulum body (3) comprises:

- a first pendulum mass (5) and a second pendulum mass (5) axially spaced with respect to one another, the first pendulum mass (5) being arranged axially on a first side (4) of the support (2) and the second pendulum mass (5) being arranged axially on a second side (4) of the support (2); and
- at least one connecting member (6) connecting the first pendulum mass and the second pendulum mass (5) for pairing the first and second pendulum masses.

10. The device according to claim 1, wherein each pendulum body (3) comprises:

- a first pendulum mass (5) and a second pendulum mass (5) axially spaced with respect to one another, the first pendulum mass (5) being arranged axially on a first side (4) of the support (2) and the second pendulum mass (5) being arranged axially on a second side (4) of the support (2); and
- at least one connecting member (6) connecting the first pendulum mass and the second pendulum mass (5) for pairing the first and second pendulum masses.

11. The device according to claim 10, wherein each pendulum body (3) extends angularly over a global angle value ($\alpha$) measured from the axis (X) between two circumferential ends (7, 8) that correspond to circumferential ends of the first and second pendulum masses (5) of the pendulum body (3), wherein each second raceway (13) is arranged inside an angular sector ($\beta$) measured from the axis (X) and extending from one circumferential end (7, 8) of the pendulum body (3) toward the other circumferential end (7, 8) of the pendulum body (3), and wherein a ratio between the angular sector ($\beta$) and the global angle ($\alpha$) being between 1/15 and 1/2.

12. The device according to claim 11, wherein the second raceway (13) integral with the pendulum body (3) being defined by the connecting member (6).

13. The device according to claim 11, wherein each bearing member (11) interacts with two second raceways (13) integral with the pendulum body (3), wherein one of the second raceways (13) is defined by the first pendulum mass (5) and the other of the second raceways (13) is defined by the second pendulum mass (5).

14. The device according to claim 10, wherein the second raceway (13) integral with the pendulum body (3) being defined by the connecting member (6).

15. The device according to claim 14, wherein each pendulum body (3) comprising two connecting members (6) pairing the first (5) and the second pendulum mass (5), each connecting member (6) defining a second raceway (13) interacting respectively with one of the two bearing members (11) guiding the movement of that pendulum body (3) with respect to the support (2).

16. The device according to claim 15, wherein each window (19) receiving:

- a bearing member (11) interacting with at least one second raceway (13) integral with one of the pendulum bodies (3);
- a connecting member (6) pairing the first (5) and the second pendulum mass (5) of that pendulum body (3);
- the other bearing member (11) interacting with at least one second raceway (13) integral with the other pendulum body (3), said pendulum bodies (3) being circumferentially adjacent; and
- a connecting member (6) pairing the first (5) and the second pendulum mass (5) of that other pendulum body (3).

17. The device according to claim 10, wherein each bearing member (11) interacts with two second raceways (13) integral with the pendulum body (3), and wherein one of the second raceways (13) is defined by the first pendulum mass (5) and the other of the second raceways (13) is defined by the second pendulum mass (5).

18. The device according to claim 17, wherein each pendulum body (3) comprises the at least one connecting member (6) pairing the first pendulum mass (5) and the second pendulum mass (5).

19. The device according to claim 18, wherein each pendulum body (3) comprises a plurality of connecting members (6), and wherein all the connecting members (6) of each of the pendulum masses (3) are arranged between the two bearing members (11) guiding the movement of that pendulum body (3) with respect to the support (2).

20. A component for a transmission system of a motor vehicle, the component being one of a dual mass flywheel, a hydrodynamic torque converter, a friction clutch disk, a dry dual clutch, a wet dual clutch, a wet single clutch and a flywheel integral with a crankshaft, the component comprising a damping device (1) according to claim 1.

* * * * *